C. H. ANTHONY.
SPROCKET WHEEL.
APPLICATION FILED MAR. 6, 1918. RENEWED MAY 1, 1922.

1,433,923.  Patented Oct. 31, 1922.

WITNESSES:
Harry C Dean
Dudley T. Fisher

INVENTOR.
BY Carl H Anthony
ATTORNEY.

Patented Oct. 31, 1922.

1,433,923

UNITED STATES PATENT OFFICE.

CARL H. ANTHONY, OF BALTIMORE, MARYLAND, ASSIGNOR TO THE JEFFREY MANUFACTURING COMPANY, OF COLUMBUS, OHIO, A CORPORATION OF OHIO.

SPROCKET WHEEL.

Application filed March 6, 1918, Serial No. 220,795. Renewed May 1, 1922. Serial No. 557,806.

*To all whom it may concern:*

Be it known that I, CARL H. ANTHONY, a citizen of the United States, residing at Baltimore, State of Maryland, have invented certain new and useful Improvements in Sprocket Wheels, of which the following is a specification, reference being had therein to the accompanying drawing.

The present invention relates to certain new and useful improvements in sprocket wheels of the class having chain engaging rim parts adapted to be renewed when worn by contact with the driving chains.

The object of this invention is to provide a sprocket wheel of improved construction, the chain engaging rim parts of which may be removed and replaced by a new toothed element without removing the wheel from its supporting shaft and without dismounting the driving chain from the sprocket wheel.

The devices by which I attain this object are fully set forth in the following specification and illustrated in the accompanying drawing of which—

Like numerals refer to similar parts in the several figures.

Figure 1:
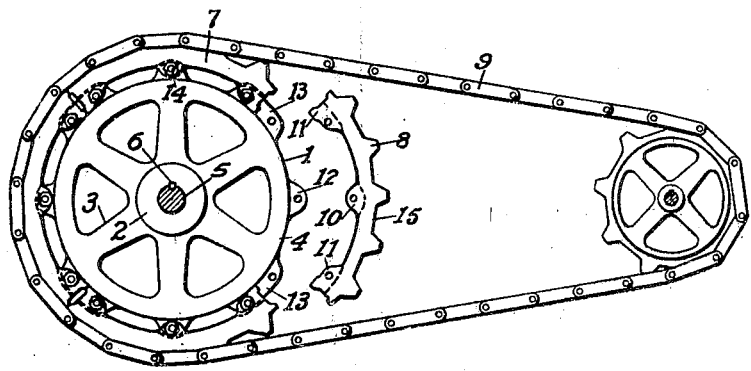
Fig. 1 is an assembly view of a power transmission couple including a sprocket wheel embodying my present invention.
Figure 2:
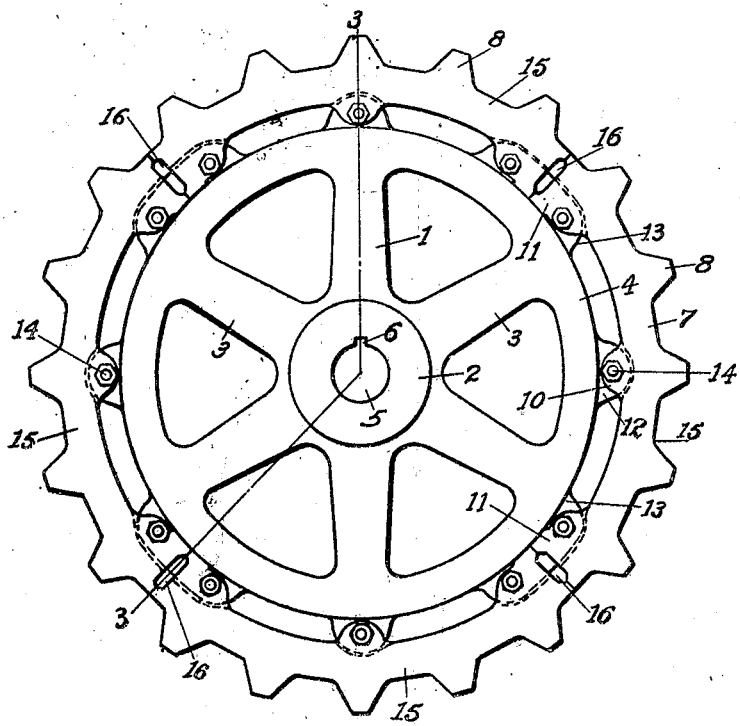
Fig. 2 is an enlarged side elevation of the driving wheel illustrated in Fig. 1.
Figure 3:
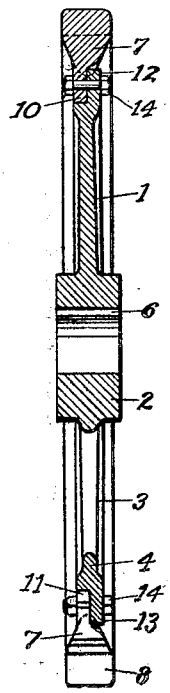
Fig. 3 is a sectional view taken along the line 3—3 of Fig. 2.

Referring to the drawings the numeral 1 indicates, as an entirety, a cast metal wheel center having a central hub 2 radially extending arms 3 and a circular rim 4. The hub 2 is provided with a bore 5 adapted to be fitted to a suitable shaft and has the customary key way 6 adapted to receive a suitable key by which the wheel may be secured against movement relative to the shaft.

Encircling the above described wheel center is a ring 7 upon the periphery of which are formed sprocket teeth 8 adapted to engage the driving chain 9 in the manner common to sprocket wheels. Extending inwardly from the ring 7 are lugs 10 and 11 adapted to engage with similar lugs 12 and 13 of the wheel center to which they may be securely attached by the attachment bolts 14. The ring 7 is initially formed as a single integral casting, in order that the pitch distance from tooth 8 to each of those adjacent can be maintained throughout the entire circle and to avoid the disadvantageous results from uneven shrinkages which are experienced when several segmental sections of a toothed rim are separately formed initially.

However, as it is necessary in carrying out my invention to have the toothed rim, as an entirety, readily separable, it is cast in such a way that while its sections are held together with sufficient firmness to attain the purposes above described, they are nevertheless transversely frangible at each of several predetermined radial lines. To provide for this, cores at the time of casting, are placed at 16, 16 in the mold. After the casting is formed each section of the rim is held to its neighbors with considerable strength, so as to guard against disadvantages from shrinkage, but at the same time the blow of a hammer and a chisel on the radial line of a core opening 16 will fracture the metal. For the purpose of illustration I have shown such a ring comprising four equal parts, said parts being of such length that during a part of each revolution of the wheel each segment will be entirely out of engagement with the driving chain. When the sprocket teeth of such a wheel become worn through use a ring section 15 while out of engagement with the driving chain may be unbolted from the wheel center as shown in Fig. 1 and then by a properly applied blow this section may be separated from the ring whereupon a similar segment of a new ring can be bolted in its place. The wheel may then be rotated through a sufficient part of a revolution to release a second section 15 from engagement with the chain and the operation repeated until the entire ring has been renewed.

At the time the first toothed ring is applied to the wheel center it may be divided into its several segments, but this is not necessary and under many circumstances it is preferable to leave the ring remain in its integral condition until it is desired to substitute a new toothed rim. In the drawings the several segments are shown as separated. Many of the chains used with such sprocket wheels are heavy and cumbersome, in some cases each link weighing several pounds. The opening of the chains to detach them from the wheel at the time when repairs are to be made is often a matter of serious difficulty. In the present case there is no occasion for ever removing a link or inserting one. The pitch factors, the relative speeds of the parts and other conditions remain constant.

I am aware that various plans have been suggested for varying the pitch diameters of sprocket wheels and for building up the rim parts of such wheels with several curved sections of a rim of such a wheel. But I believe myself to be the first to have provided for the replacement of the toothed rim of a sprocket wheel initially cast as an integral entirety (with all of the well known advantages incident to such device) with a new toothed rim likewise initially cast integral and adapted to have its parts inserted successively for the parts of the original rim.

What I claim as new and desire to protect by Letters Patent is:—

1. The herein described sprocket-chain wheel comprising the central element having the hub, the spokes, and the rim integral with the spokes and with the hub, and extending continuously around the axis and cast with the comparatively wide outward-extending lugs 13 and the intermediate lugs 12, in combination with the detachable toothed ring 15, formed of several sections, each with broken ends fitted tightly to the broken ends of the adjacent section, and each having at each end a lug 11 secured to one of the aforesaid rim lugs 13 and an intermediate lug 10 secured to one of the aforesaid rim lugs 12.

2. In a sprocket chain wheel, the combination with a wheel center comprising a continuous rim having outwardly projecting lugs formed integral therewith, of a detachable toothed ring concentric with said rim and formed of several sections each with broken ends fitting tightly to the broken ends of the adjacent sections and each having a plurality of inwardly projecting lugs adapted to engage and be secured to the aforesaid outwardly projecting rim lugs.

3. In a sprocket chain wheel the combination with a wheel center comprising a continuous rim having outwardly projecting lugs formed integral therewith, of a detachable toothed ring concentric with said rim and formed of several sections the ends of each section fitting tightly to the ends of the adjacent sections and each having a plurality of inwardly projecting lugs adapted to engage and be secured to the aforesaid outwardly projecting rim lugs.

4. In a sprocket chain wheel, the combination with a wheel center comprising a continuous rim having outwardly projecting lugs formed integral therewith, of a detachable toothed ring formed of several sections the ends of each section fitting tightly to the ends of the adjacent sections, and each having an inwardly projecting lug adjacent each end which is adapted to engage and be secured to one of the aforesaid outwardly projecting rim lugs.

In testimony whereof I affix my signature, in presence of two witnesses.

CARL H. ANTHONY.

Witnesses:
C. ROLLINS ROGERS,
ISABELLE LINDEMAN.